United States Patent Office 3,704,328
Patented Nov. 28, 1972

3,704,328
4- AND 5-ARYL-1-NAPHTHALENEETHANOL COMPOUNDS
James S. Kaltenbronn, 3555 Greenbrier Drive, Apt. 70C, Ann Arbor, Mich. 48105, and Franklin W. Short, 3431 Clover Drive, Saline, Mich. 48176
No Drawing. Continuation-in-part of application Ser. No. 573,871, Aug. 22, 1966. This application Jan. 21, 1970, Ser. No. 4,744
Int. Cl. C07c 31/14; A61k 27/00
U.S. Cl. 260—618 F                     4 Claims

ABSTRACT OF THE DISCLOSURE 4-phenyl- and 5-phenyl-1-naphthaleneethanols, optionally substituted by o- or m-halo or by β-methyl. The compounds have pharmacological activity and can be produced by (a) reducing a carboxylic acid, salt, or ester, (b) reacting a 1-naphthylmagnesium halide with ethylene oxide and hydrolyzing the product or (c) reacting a 1-naphthylmethylmagnesium halide with formaldehyde and hydrolyzing the product.

CROSS REFERENCE TO RELATED APPLICATION

This is a continuation-in-part of our co-pending application Ser. No. 573,871, filed Aug. 22, 1966, now abandoned.

SUMMARY AND DETAILED DESCRIPTION

This invention relates to new 1-naphthaleneethanol compounds. More particularly, the invention relates to new 4- and 5-aryl-1-naphthaleneethanols of the formula

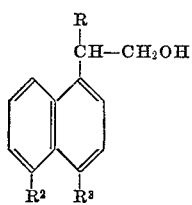

and to methods for their production; where R represents hydrogen or methyl; one of $R^2$ and $R^3$ represents hydrogen; and the other of $R^2$ and $R^3$ represents

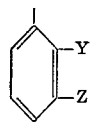

where one of Y and Z represents hydrogen and the other of Y and Z represents hydrogen, fluorine, or chlorine.

In accordance with the invention, the compounds of the foregoing formula are produced by reacting a compound of the formula

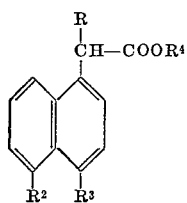

with a reducing agent; where R, $R^2$, and $R^3$ are as defined before and $R^4$ represents hydrogen, a salt-forming cation, or a lower alkyl radical of fewer than 4 carbon atoms. The preferred method of carrying out the reduction is by reacting the carboxylic acid, salt, or ester with a complex metal hydride followed by or accompanied by hydrolysis of the product. Some examples of suitable complex metal hydrides are lithium aluminum hydride, lithium aluminum hydride-aluminum chloride, aluminum hydride-aluminum chloride, and sodium borohydride-aluminum chloride. In the case where a lower alkyl ester is the starting material, it is also satisfactory to carry out the reduction with sodium borohydride or to use a non-hydride reducing agent such as sodium in ethanol. The preferred reducing agent is lithium aluminum hydride followed by hydrolysis of the product. Preferred solvents for use with most of the complex metal hydrides named above are ethereal solvents such as diethyl ether, tetrahydrofuran, 1,2-dimethoxyethane, and diethylene glycol dimethyl ether. However, in the case of sodium borohydride, preferred solvents are water, dioxane, lower alkanols such as ethanol, and mixtures thereof. The required ratio of reactants depends on the particular starting materials used. For example, reduction with lithium aluminum hydride requires three-quarters of a mole of lithium aluminum hydride for each mole of carboxylic acid or one-half mole of lithium aluminum hydride for each mole of carboxylic acid ester. However, these calculated ratios are not normally employed as it is preferred to use a relatively large excess of the lithium aluminum hydride or other reducing agent. Thus, it is customary to use 2 moles of lithium aluminum hydride to reduce 1 mole of a carboxylic acid or up to 10 moles of sodium borohydride to reduce 1 mole of a carboxylic acid ester. The time and temperature of the reaction are not particularly critical and likewise are dependent on the specific reactants employed. In general, the reaction is carried out at a temperature between 0° and 120° C., with lithium aluminum hydride reductions preferably carried out at about 35–65° C. and sodium borohydride reductions preferably carried out at about 75° C. The usual reaction time with lithium aluminum hydride is from 1 to 20 hours, optimally about 3 hours; and with sodium borohydride about 17 to 30 hours, optimally about 22 hours. Following reaction with a complex metal hydride in a non-aqueous solvent, the mixture is hydrolyzed with water or other aqueous medium and the product isolated. In other cases the product can be isolated directly.

The 4- and 5-aryl-1-naphthaleneacetic acids, salts, and lower alkyl esters employed as starting materials in the foregoing process can be prepared by any of a variety of methods. For example, the carboxylic acids and their salts can be prepared by hydrolysis of the corresponding 4- and 5-aryl-1-naphthylacetonitriles, as described in greater detail in British patent specification No. 1,009,288 and in U.S. patent application No. 451,625, filed Apr. 28, 1965, now U.S. Pat. No. 3,468,939. The lower alkyl esters can be prepared by heating the carboxylic acids with a lower alkanol in the presence of an acid catalyst.

Also in accordance with the invention, compounds of the formula

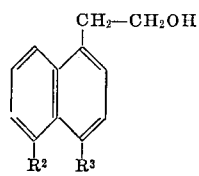

are produced by reacting a 4- or 5-aryl-1-naphthalene reactive metal derivative which can be represented by the formula

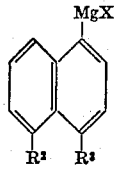

with ethylene oxide in an anhydrous medium, followed by hydrolyzing the product; where X represents halogen, preferably bromine, and $R^2$ and $R^3$ are as defined before. The first step of this process is carried out in an anhydrous, non-hydroxylic solvent. Some suitable solvents are lower molecular weight ethers such as diethyl ether, tetrahydrofuran, dioxane, and dimethoxyethane; and aromatic hydrocarbons such as benzene and toluene. A preferred solvent is diethyl ether. The reactive metal derivative is customarily prepared in situ by reacting a 4- or 5-aryl-1-halonaphthalene with magnesium but, if desired, it can be prepared separately and added to the reaction mixture as such. The reactive metal derivative and the ethylene oxide can be employed in approximately equimolar amounts, although preferably up to a moderate excess of the ethylene oxide is used. The time and temperature of the first step of the process are not critical and it is customary to carry out the reaction at a temperature between 0° and 25° C., or occasionally up to the reflux temperature of the solvent. For convenience in handling the volatile ethylene oxide, a reaction temperature of about 10° C. is preferred, with a reaction time of from a few minutes to 24 hours, typically about 1 hour. Following the reaction of the reactive metal derivative with ethylene oxide under anhydrous conditions, the product is hydrolyzed with dilute aqueous acid or other aqueous medium and the 4- or 5-aryl-1-naphthaleneethanol compound is isolated.

Further in accordance with the invention, compounds of the formula

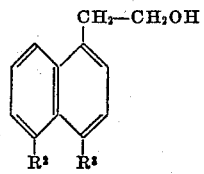

are produced by reacting a 4- or 5-aryl-1-methylnaphthalene reactive metal derivative which can be represented by the formula

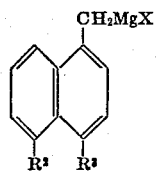

with formaldehyde in an anhydrous medium, followed by hydrolyzing the product; where X represents halogen, preferably bromine or chlorine, and $R^2$ and $R^3$ are as defined before. The first step of this process is carried out in an anhydrous, non-hydroxylic solvent. Some suitable solvents are lower molecular weight ethers such as diethyl ether, tetrahydrofuran, dioxane, and dimethoxyethane; and aromatic hydrocarbons such as benzene and toluene. A preferred solvent is diethyl ether. The reactive metal derivative is customarily prepared in situ by reacting a 4- or 5-aryl-1-halomethylnaphthalene with magnesium but, if desired, it can be prepared separately and added to the reaction mixture as such. The reactive metal derivative and the formaldehyde can be employed in approximately equimolar amounts, although preferably up to a moderate excess of the formaldehyde is used. The time and temperature of the first step of the process are not critical and it is customary to carry out the reaction at a temperature between 0° and 25° C., or occasionally up to the reflux temperature of the solvent. For convenience in handling the volatile formaldehyde, a reaction temperature of about 10° C. is preferred, with a reaction time of from a few minutes to 24 hours, typically about 1 hour. Following the reaction of the reactive metal derivative with formaldehyde under anhydrous conditions, the product is hydrolyzed with dilute aqueous acid or other aqueous medium and the 4- or 5-aryl-1-naphthaleneethanol compound is isolated.

The 4- or 5-aryl-1-halomethylnaphthalenes useful as starting materials in the foregoing process can be prepared by any of a variety of methods. For example, a 1-arylnaphthalene is reacted with paraformaldehyde and hydrochloric acid to produce a 4-aryl-1-chloromethylnaphthalene. Alternatively, a 4- or 5-aryl-1-methylnaphthalene is reacted with N-bromosuccinimide to produce a 4- or 5-aryl-1-bromomethylnaphthalene.

The compounds of the invention are new chemical compounds useful as pharmacological agents. They are antiinflammatory agents and are of value in relieving inflammatory conditions as well as in preventing or suppressing the occurrence of inflammation. Their activity can be demonstrated and measured in a standard laboratory test using depilated guinea pigs. This test is described in Archives Internationales de Pharmacodynamie et de Therapie, 116, 261–292 (1958). It has been accepted as a method for measuring selectively the anti-inflammatory activity in non-steroids. In this test procedure, animals are given a selected dose of a test compound and these treated animals and untreated controls are subjected to an exposure of ultraviolet radiation sufficient to cause erythema in the untreated animals. An effective dose of an active compound produces a statistically significant degree of protection against the development of erythema. In this test, 4-phenyl-1-naphthaleneethanol, a preferred compound of the invention, was rated active at an oral dose of 1.6 mg./kg. 5-phenyl-1-naphthaleneethanol, another preferred compound of the invention, was rated active at an oral dose of 0.2 mg./kg. The indicated doses are pharmacologically acceptable doses. The compounds of the invention are preferably administered by the oral route although parenteral administration can also be used.

The invention is illustrated by the following examples.

EXAMPLE 1

With stirring, a solution of 5.0 g. of 4-phenyl-1-naphthaleneacetic acid in 30 ml. of tetrahydrofuran is added dropwise to a suspension of 1.45 g. of lithium aluminum hydride in 15 ml. of ether and 15 ml. of tetrahydrofuran. The resulting mixture is heated at reflux for 3 hours and then hydrolyzed by stirring with ethyl acetate and water. The organic phase is separated, combined with ether extracts of the insoluble inorganic residue, and washed with saturated sodium chloride solution. The organic phase is dried and evaporated to give a viscous residue of 4-phenyl-1-naphthaleneethanol. For purification, it is distilled in vacuo; B.P. 175–180° C. at 0.2 mm.

By the same procedure, with the substitution of an equivalent amount of 5-phenyl-1-naphthaleneacetic acid for the 4-phenyl-1-naphthaleneacetic acid, the product obtained is 5-phenyl-1-naphthaleneethanol; B.P. 180–205° C. at 0.2 mm. The product crystallizes on trituration with hexane; M.P. 51–53° C.

By the same procedure, with the substitution of an equivalent amount of 5-(m-fluorophenyl)-1-naphthaleneacetic acid for the 4-phenyl-1-naphthaleneacetic acid, the product obtained is 5-(m-fluorophenyl)-1-naphthaleneethanol; B.P. 173–180° C. at 0.25 mm.

By the same procedure, with the substitution of an equivalent amount of α-methyl-5-phenyl-1-naphthaleneacetic acid for the 4-phenyl-1-naphthaleneacetic acid, the product obtained is β-methyl-5-phenyl-1-naphthaleneethanol; B.P. 183–185° C. at 0.4 mm.

The naphthaleneacetic acid compounds required as starting materials can be prepared by hydrolysis of the corresponding nitriles. For example, a solution of 90 g. of 5-phenyl-1-naphthylacetonitrile in 300 ml. of dimethyl sulfoxide is added dropwise to 19.3 g. of a 53.4% suspension of sodium hydride in mineral oil and 200 ml. of dimethyl sulfoxide with the temperature maintained below 25° C. The reaction mixture is stirred at room temperature for 5 hours. With continued stirring and cooling to maintain the temperature below 25° C., 105 g. of methyl iodide is slowly added and the resulting mixture stirred for 18 hours. Excess sodium hydride is then decomposed by the cautious addition of 90 ml. of acetic acid in 200 ml. of water. The mixture is extracted with ether and the ether extract is separated, washed with water, with saturated sodium bicarbonate solution, and with water, dried over sodium sulfate, and evaporated to give a residue of α-methyl-5-phenyl-1-naphthylacetonitrile; M.P. 91–92.5° C. following crystallization from benzene-hexane. A mixture of 70.5 g. of α-methyl-5-phenyl-1-naphthylacetonitrile, 900 ml. of 95% ethanol, 70.5 g. of potassium hydroxide, and 250 ml. of water is stirred and heated at reflux for 16 hours. The mixture is concentrated to a small volume, diluted with water, and washed twice with ether. The aqueous solution is acidified with dilute hydrochloric acid and the insoluble α-methyl-5-phenyl-1-naphthaleneacetic acid collected on a filter; M.P. 137–138° C. following crystallization from aqueous ethanol.

EXAMPLE 2

With stirring, a solution of 3.9 g. of the methyl ester of 4-phenyl-1-naphthaleneacetic acid in 10 ml. of absolute ethanol is added dropwise to a suspension of 5.7 g. of sodium borohydride in 35 ml. of absolute ethanol. The mixture is heated at reflux for 22 hours, concentrated to a small volume, diluted with 150 ml. of water, heated at 90–100° C. for 10 minutes, and extracted with chloroform. The chloroform extract is separated, washed with water, dried over anhydrous sodium sulfate, and evaporated to give a residue of 4-phenyl-1-naphthaleneethanol. For purification, the product is distilled in vacuo; B.P. 175–180° C. at 0.2 mm.

EXAMPLE 3

A solution is prepared by dissolving 28.3 g. of 1-bromo-4-phenylnaphthalene in 75 ml. of ether. A small portion of this solution is added to a mixture of 2.4 g. of magnesium and 25 ml. of ether, containing a crystal of iodine. When the beginning of a reaction is observed, the remainder of the 1-bromo-4-phenylnaphthalene solution is added at a rate to maintain the mixture under slow reflux. One hour after the addition is complete, the mixture (containing 4-phenyl-1-naphthylmagnesium bromide) is cooled to 10° C. and a solution of 4.8 g. of ethylene oxide in 50 ml. of ether is added dropwise. The mixture is then stirred for 1 hour at 10° C., allowed to warm to room temperature, and stirred into an ice and hydrochloric acid mixture. The organic phase is separated, washed with water, with saturated sodium bicarbonate solution, and with several more portions of water. It is then dried and evaporated to give a residue of 4-phenyl-1-naphthaleneethanol. For purification, the product is distilled in vacuo; B.P. 175–180° C. at 0.2 mm.

EXAMPLE 4

A small portion of a solution of 33.1 g. of 4-(o-chlorophenyl)-1-bromomethylnaphthalene in 175 ml. of ether is added to a mixture of 2.4 g. of magnesium in 25 ml. of ether. When the reaction is observed to start, the remainder of the solution is added dropwise, with cooling as necessary. The mixture, containing 4-(o-chlorophenyl)-1-naphthylmethylmagnesium bromide, is stirred for 1 hour at 10° C. and then a stream of nitrogen and formaldehyde (prepared by depolymerization of 4.0 g. of paraformaldehyde) is bubbled through the mixture while it is maintained below 20° C. After two more hours at 20° C., it is stirred into a mixture of ice and hydrochloric acid, heated at 90–100° C. for 1 hour, cooled, and extracted with ether. The ether extract is washed with water, with saturated sodium bicarbonate solution, and with several portions of water, and is then dried over anhydrous sodium sulfate and evaporated to give a residue of 4-(o-chlorophenyl)-1-naphthaleneethanol.

By the foregoing procedure, with the substitution of an equivalent amount of 4-(m-chlorophenyl)-1-chloromethylnaphthalene for the 4 - (o-chlorophenyl)-1-bromomethylnaphthalene, the product obtained is 4-(m-chlorophenyl)-1-naphthaleneethanol.

By the foregoing procedure, with the substitution of an equivalent amount of 4-phenyl-1-chloromethylnaphthalene for the 4-(o-chlorophenyl)-1-bromomethylnaphthalene, the product obtained is 4-phenyl-1-naphthaleneethanol; B.P. 175–180° C. at 0.2 mm.

What is claimed is:

1. A compound of the formula

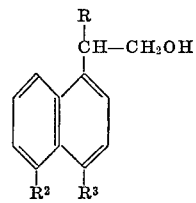

where R is a member of the class consisting of hydrogen and methyl; one of $R^2$ and $R^3$ is hydrogen; and the other of $R^2$ and $R^3$ represents

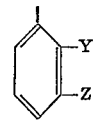

where one of Y and Z is hydrogen; and the other of Y and Z is a member of the class consisting of hydrogen, fluorine, and chlorine.

2. A compound according to claim 1 wherein R is hydrogen.
3. A compound according to claim 1 which is 4-phenyl-1-naphthaleneethanol.
4. A compound according to claim 1 which is 5-phenyl-1-naphthaleneethanol.

References Cited

UNITED STATES PATENTS

| | | |
|---|---|---|
| 3,468,939 | 9/1969 | Kaltenbronn _____ 260—515 R |
| 3,317,582 | 5/1967 | Tishler _____ 260—618 F |

OTHER REFERENCES

Blomquist et al., "Chem. Abstr.," vol. 57 (1962), cols. 7179 to 7182.

Lawesson, "Chem. Abstr.," vol. 53 (1959), col. 1266.

LEON ZITVER, Primary Examiner

J. E. EVANS, Assistant Examiner

U.S. Cl. X.R.

260—618 P, 649 R, 649 F, 665 G, 999